United States Patent
Cooper et al.

(10) Patent No.: US 10,976,457 B2
(45) Date of Patent: Apr. 13, 2021

(54) FULL WAVEFORM INVERSION OF SEISMIC DATA USING PARTIAL MATCH FILTERING

(71) Applicant: CGG SERVICES SAS, Massy (FR)

(72) Inventors: James Cooper, Redhill (GB); Andrew Ratcliffe, Henfield (GB); Gordon Poole, East Grinstead (GB)

(73) Assignee: CGG SERVICES SAS, Massy (FR)

(*) Notice: Subject to any disclaimer, the term of this patent is extended or adjusted under 35 U.S.C. 154(b) by 0 days.

(21) Appl. No.: 16/913,385

(22) Filed: Jun. 26, 2020

(65) Prior Publication Data
US 2021/0063590 A1    Mar. 4, 2021

Related U.S. Application Data

(60) Provisional application No. 62/893,850, filed on Aug. 30, 2019.

(51) Int. Cl.
*G01V 1/28* (2006.01)
*G01V 1/30* (2006.01)
*G01V 1/34* (2006.01)

(52) U.S. Cl.
CPC .............. *G01V 1/282* (2013.01); *G01V 1/306* (2013.01); *G01V 1/34* (2013.01)

(58) Field of Classification Search
USPC .......................................................... 702/16
See application file for complete search history.

(56) References Cited

U.S. PATENT DOCUMENTS

| | | | | | |
|---|---|---|---|---|---|
| 3,011,582 | A | * | 12/1961 | Peterson | G01V 1/245 367/42 |
| 8,892,413 | B2 | * | 11/2014 | Routh | G01V 1/28 703/10 |
| 10,310,123 | B2 | | 6/2019 | Xu et al. | |
| 2013/0294196 | A1 | * | 11/2013 | Childs | G01V 1/282 367/46 |
| 2013/0338922 | A1 | * | 12/2013 | Yarman | G01V 1/282 702/6 |
| 2016/0047925 | A1 | * | 2/2016 | Lou | G01V 1/303 702/18 |
| 2016/0238729 | A1 | * | 8/2016 | Warner | G01V 1/282 |
| 2017/0115418 | A1 | * | 4/2017 | Gratacos | G01V 1/282 |
| 2017/0248714 | A1 | * | 8/2017 | Rickett | G01V 1/301 |

(Continued)

FOREIGN PATENT DOCUMENTS

| | | |
|---|---|---|
| GB | 2509223 A | 6/2014 |
| WO | 2016154404 A1 | 9/2016 |
| WO | 2019186286 A1 | 10/2019 |

OTHER PUBLICATIONS

Erik C. Hicks et al., "Time-lapse full-waveform inversion as a reservoir-monitoring tool—A North Sea case study," The Leading Edge, 2016, pp. 850-858.

(Continued)

*Primary Examiner* — Paul D Lee
(74) *Attorney, Agent, or Firm* — Patent Portfolio Builders PLLC

(57) ABSTRACT

Methods and apparatuses for seismic exploration of an underground structure obtain improved images by integrating partial match filtering in an FWI. Filtered (auxiliary) data replaces one of the observed data and the synthetic data in the FWI's objective function to avoid cycle skipping.

20 Claims, 6 Drawing Sheets

(56) References Cited

U.S. PATENT DOCUMENTS

| | | | |
|---|---|---|---|
| 2019/0302293 A1* | 10/2019 | Zhang | G01V 1/303 |
| 2020/0393588 A1* | 12/2020 | Bai | G01V 1/362 |
| 2021/0018639 A1* | 1/2021 | Sun | G01V 1/303 |

OTHER PUBLICATIONS

Gang Yao et al., "Tackling cycle skipping in full-waveform inversion with intermediate data," Geophysics, 2019, pp. R411-R427, vol. 84, No. 3.

Gerard T. Schuster "Seismic Inversion," Investigations in Geophysics Series No. 20, Society of Exploration—Geophysicists, 2017, 36 pages.

Hejun Zhu et al., "Applications of adaptive matching filter in full waveform inversion," SEG International Exposition and 86th Annual Meeting, 2016, pp. 1438-1443.

Lluis Gausch et al., "Full-waveform inversion imaging of the human brain," Digital Medicine, Nature Partner Journal, 2020, pp. 1-12, vol. 3 No. 28.

M. Wang et al., "Dynamic-warping full-waveform inversion to overcome cycle skipping," SEG International Exposition and 86th Annual Meeting, 2016, pp. 1273-1277.

Michael Warner et al., "Adaptive Waveform Inversion—FWI Without Cycle Skipping," SEG Full Waveform Inversion: Depth Model Building Workshop, 76th EAGE Conference and Exhibition, 2014, pp. 11-14.

Roel Snieder, "General theory of elastic wave scattering," Chapter 1.7.1. In Scattering and Inverse Scattering in Pure and Applied Science, Academic Press, 2001, pp. 528-542.

S. Xu et al., "Full Waveform Inversion for Reflected Seismic Data", 74th EAGE Conference & Exhibition incorporating SPE EUROPEC, Copenhagen, Denmark, Jun. 4-7, 2012, 5 pages.

Simon Luo et al., "A deconvolution-based objective function for wave-equation inversion," SEG San Antonio 2011 Annual Meeting, 2011, pp. 2788-2792.

T. N. Bishop et al., "Tomographic determination of velocity and depth in laterally varying media," Geophysics, Jun. 1985, pp. 903-923, vol. 50, No. 6.

Y. Luo et al., "Wave-equation traveltime inversion," Geophysics, May 1991, pp. 645-653, vol. 56, No. 5.

Yu Zhang et al., "Traveltime information-based wave-equation inversion," Geophysics, 2009, pp. WCC27-WCC36, vol. 74, No. 6.

Zhigang Zhang et al., "Correcting for salt misinterpretation with full-waveform inversion," SEG International—Exposition and 88th annual Meeting, 2018, pp. 1143-1147.

Search Report for corresponding/related United Kingdom Application No. GB2010748.8, dated Jan. 11, 2021.

* cited by examiner

600

FULL WAVEFORM INVERSION OF SEISMIC DATA USING PARTIAL MATCH FILTERING

BACKGROUND

Technical Field

Embodiments of the subject matter disclosed herein generally relate to seismic exploration methods and devices using a Full Waveform Inversion (FWI) approach to produce an image of a subsurface formation from seismic data. More specifically, the embodiments use partial match filtering to achieve a better outcome of FWI, such as avoiding cycle skipping and addressing amplitude inconsistencies between observed and modeled data.

Discussion of the Background

The structure of underground formations on land or at sea may be probed using waves (seismic waves, but electromagnetic waves may also be used on land). FIG. 1 illustrates a marine survey, in which seismic waves emitted by a source 110 towed by a vessel travel through a water layer to penetrate through seafloor 112 into the explored formation. The waves are reflected, transmitted, refracted or diffracted at interfaces such as 122, 124, 126 that separate formation's layers 121, 123, 125, 127, which have different geophysical properties (e.g., wave propagation velocity, density, etc.). Sensor 130 detects waves like 140 and 150 emerging from the explored formation. One type of transmitted wave, termed a diving wave, bends back up to the surface to be recorded by the sensor. Diving waves are recognised to be useful in some applications of full waveform inversion. Note that in other survey setups, the sensor and/or the source may be placed on the seafloor 112. Although in FIG. 1 only one sensor is illustrated, the emerging waves are typically detected by plural sensors at different locations. The sensors detecting the waves generate and record data (sometimes called observed data) that are time series of sampled wave amplitudes.

The recorded data is processed to extract an image of the explored subsurface. Here, the term "image" should not be narrowly construed as a two-dimensional representation of some property values; the intended meaning is broader, encompassing nature (e.g., type and properties) and location (e.g., interfaces, outer limits) of the layers inside the underground formation. Full Waveform Inversion (FWI), which is illustrated in FIG. 2, is one method used to extract such images. FWI updates a current model of the explored subsurface by minimizing at 230 a misfit between the recorded data 210 and synthetic data generated at 220 using the current model. The model is a three-dimensional map of parameter values and may be referred to as an "earth model." The model values correspond to one or more parameters, such as wave propagation velocity, density, attenuation, anisotropy, etc. The misfit is defined by an objective function that measures similarity (e.g., least-squares difference) between the recorded and the synthetic data.

FWI performs steps 220 and 230 iteratively until a loop-exiting criterion, LEC, is met. The LEC may be related to a model's convergence or simply a predetermined number of iterations. In the case of complex models with multiple non-independent parameters, different subsets of the parameter values may be updated at different iterations. An initial model 200 used at a first iteration may have been calculated using travel time tomography on the seismic data (as described, for example, in the 1985 article, "Tomographic determination of velocity and depth in laterally varying media," by Bishop et al., published in *Geophysics* 50, pp. 903-923), from previous applications of FWI on the seismic data or using well log information. Optionally, additional information 205 (such as well log data or anisotropy parameter values obtained from core analysis) may be used to define the model and generate synthetic data and/or to constrain the minimization. The basic premise of FWI is that the repeatedly updated model converges to a true representation of the underground formation's structure, which is (or may be) used to generate the image of the explored subsurface formation 240. This image of the explored subsurface formation may be generated indirectly by a migration operation, such as reverse time migration, wave equation migration, beam migration or Kirchhoff migration, or an operation applied to the model itself, such as generating the pseudo-reflectivity through derivative operations on the model. The derivative operation may be perpendicular to the structure. The image of the explored subsurface formation may also be the model directly, as described, for example, in the 2010 book "Seismic Imaging" by Robein, E., published by EAGE Publications.

Mathematically, FWI is a nonlinear inversion problem. If G, a nonlinear operator of a forward traveling wave, is applied to M, the true model of the subsurface through which the wave travels before being detected, $$G(M)=p \qquad (1)$$

the result p is ideal (noiseless) recorded data. FWI tries to identify a candidate model V that when subjected to operator G closest approximates the recorded data d (which may be affected by noise or detection imperfections)

$$G(V) \cong d. \qquad (2)$$

Iterative gradient-based inversion algorithms such as Steepest Descent, conjugate gradients or Limited-memory Broyden-Fletcher-Goldfarb-Shanno (LBFGS) have been used to solve this inversion problem, but alternate inversion schemes exist.

A well-known problem in FWI is cycle skipping that occurs when the timing of a synthetic waveform (predicted by a candidate model) differs from an observed waveform (obtained from observed seismic data) by more than half a cycle. In such circumstances, the objective function minimized in FWI may converge to a local minimum, which is an erroneous velocity model, instead of the global minimum which is the true velocity model corresponding to the explored subsurface formation's structure. In an attempt to overcome this problem, global inversions based, for example, on simulated annealing, genetic algorithms, quantum swarm particle optimization, Monte Carlo, or evolution algorithms have been used. While such approaches should be immune to local minima, this benefit comes at a vast increase in computational effort; that is, using global inversions in anything other than small, or reduced, problems is generally prohibitive.

Cycle skipping becomes increasingly prevalent as the inaccuracy of the initial velocity model increases. Depending on a variety of factors (for example, geological complexity and availability of well log information), obtaining an initial model sufficiently accurate to avoid cycle skipping can be a significant challenge. Improving the initial model and/or starting the inversion from a lower seismic frequency is not always possible (depending also on the quality of the recorded data). The quest for better data at an ever-lower frequency has lately been a very active subfield of seismic exploration. However, acquiring better data is a non-trivial task that may require specialized equipment, and, of course, data cannot be retroactively improved. It is therefore of interest to develop FWI approaches robust to cycle skipping, converging to the global minimum even if starting from an inaccurate initial velocity model.

Conventional methods trying to mitigate the cycle skipping problem have changed the underlying objective function, modifying the traditional least-squares data difference. However, as discussed below, these methods with modified objective functions can have problems that may limit their application.

The 1991 article, "Wave-equation travel time inversion," by Luo et al., published in *Geophysics* 56, pp. 645-653, uses an alternative objective function based on the travel time difference of the recorded and synthetic data, the model being updated to minimize the travel time shifts between the observed and synthetic data. The use of a travel-time-based objective function makes the FWI robust to cycle skipping and, being based on kinematics only, removes complications with different amplitude behavior between the observed and modeled data caused by, for example, a visco-elastic real Earth and acoustic modeling of the synthetic data. However, the FWI using the travel-time-based objective function provides less model resolution compared to FWI using the least-squares data-difference-based objective function, and requires calculating the travel time shifts between the synthetic data and the recorded data, which may be ambiguous in the absence of "event similarity" (i.e., the notion that the same, distinct events exist in both the synthetic and recorded data, albeit with different travel times).

The 2014 article, "Adaptive Waveform Inversion—FWI Without Cycle Skipping—Theory" by Warner et al., published in 76th EAGE Conference and Exhibition, Extended Abstracts, and in U.K. Patent Application GB2509223B, proposes the use of an alternative objective function based on weighted Wiener matching filters connecting the recorded and synthetic data. Each iteration of this adaptive waveform inversion updates the model so that the Wiener filters converge to a given reference filter, often zero-lag delta functions. An additional normalization factor in the objective function ensures that the inversion does not yield a trivial solution. Use of matching filters makes the method less reliant on event similarity, and the issues related to the amplitude differences between the recorded and synthetic data are manageable, but this method can be slow to converge when the initial model is far from the true model.

In another approach, the 2016 article, "Dynamic-warping full-waveform inversion to overcome cycle skipping," by Wang et al., published in 86th SEG Annual International Meeting, Expanded Abstracts, the least-squares-based objective function uses the difference between pseudo-observed data and the synthetic data generated using the current model, instead of the difference between the recorded data and the synthetic data generated using the current model (as in conventional FWI). The pseudo-observed data is obtained by warping the recorded data partially to the synthetic data, based on the calculated travel time differences between them from a dynamic warping operation so as to avoid cycle skipping, but to preserve the qualitative differences between the recorded and synthetic data (that is, whether a velocity at a given location in the candidate model should be increased or decreased in order for the objective function to converge to the global minimum). This method relies on event similarity between the synthetic and recorded data for the warping to be effective, and it can suffer from complications due to the difference between the recorded and synthetic data amplitudes.

Similar to the dynamic-warping approach, the 2019 article, "Tackling cycle skipping in full-waveform inversion with intermediate data," by Yao et al., published in *Geophysics*, Vol. 84, pp. R411-R427, proposes creating intermediate data by shifting the synthetic data toward the recorded data by less than half a cycle at each iteration until the difference between the recorded and synthetic data is less than half a cycle, after which no shift is used until the inversion is complete. Event similarity is an important prerequisite for this approach's success.

Other authors have modified adaptive waveform inversion to incorporate dynamic time shifts applied to the observed data (for example, as described in the 2016 article, "Applications of adaptive matching filter in full waveform inversion" by Zhu et al. published in the $86^{th}$ SEG Annual International Meeting, Expanded Abstracts).

Thus, on one hand, the reliable estimation of travel time shifts between recorded and synthetic data for travel time-based objective functions is non-trivial. Most attempts to overcome cycle skipping using such objective functions fail in the absence of event similarity between recorded and synthetic data, and the resulting model's resolution may be less than the one achieved using the least-squares data difference objective functions.

On the other hand, methods using objective functions which consider the amplitude of events may fail due to amplitude inconsistencies between the datasets used in the objective function. This is not only related to the difference in physics between the recorded data and the synthetic data, but also due to incorrect assumptions related to density, and/or other parameters, which affect the seismic amplitude behavior.

All conventional methods designed to overcome the cycle skipping problem tend to converge slowly when the candidate model is far from the true model, and some also tend to be computationally slower to run. If FWI uses a gradient-based update, one way to attempt to improve computational efficiency is to improve the step length, or scaling factor, which converts the values in the gradient into the physical units of the Earth model in such a way as to decrease the objective function as much as possible.

Different strategies may be employed to estimate the step length. For example, a trial update may be applied to the model via an arbitrary scaling of the (unscaled) gradient so that the magnitude of the trial perturbation is a small percentage of the total model magnitude, such as 0.5%. Another forward modeling using the updated trial model is done and an analysis of how the objective function representing the mismatch between recorded and synthetic data has changed is carried out. Based on this analysis, a more appropriate update scaling that would give a larger reduction in the objective function is estimated (e.g., an extrapolation of the trial update). This extrapolated step length can be combined with an over-relaxation factor that scales the step length by an arbitrary amount (usually between 1 and 2) in order to try to obtain faster convergence. If the initial models are highly inaccurate, but still not cycle skipped, with large parts of it either too fast or too slow, then choosing a considerably larger over-relaxation factor (of, say, 10-20) can accelerate the convergence by forcing the model update to completely overshoot what it would normally do.

An alternative to this extrapolation-based approach of estimating the step length is to perform a line search along the gradient direction, wherein the objective function is re-computed for multiple trial step lengths until the one that gives the maximum reduction in the objective function is obtained.

It remains, however, of interest to pursue other methods to avoid or mitigate the effects of cycle skipping and amplitude inconsistencies on FWI while overcoming the shortcomings of aforementioned methods. All the articles mentioned in this section are incorporated herewith by reference.

SUMMARY

The various embodiments described in this application provide an FWI-based approach in which cycle skipping issue is alleviated by replacing one of the synthetic or observed/recorded data with auxiliary data generated using a partially matching filter, PMF.

According to an embodiment, there is a method for seismic exploration including obtaining recorded data which was acquired by probing the underground structure using seismic waves, generating synthetic data corresponding to the recorded data using a model of the underground structure, and computing a PMF partially matching the recorded data and the synthetic data. The method further includes generating auxiliary data using the PMF and one of the synthetic and recorded data; and updating the model based on the auxiliary data. The updated model is useable to locate natural resources in the explored underground structure.

According to another embodiment, there is an apparatus having an interface and a data processing unit connected to the interface. The interface is configured to obtain seismic data acquired during a survey of the underground structure using seismic waves. The data processing unit is configured to generate synthetic data corresponding to the recorded data using a model of the underground structure, to compute a PMF partially matching the recorded data and the synthetic data, to generate auxiliary data using the PMF and one of the synthetic and recorded data, and to update the model based on the auxiliary data. The updated model is useable to locate natural resources in the explored underground structure.

According to yet another embodiment, there is a computer-readable recording medium non-transitorily storing executable codes that, when executed by a processor, make the processor perform a method for seismic exploration. The method includes obtaining recorded data which was acquired by probing the underground structure using seismic waves, generating synthetic data corresponding to the recorded data using a model of the underground structure, and computing a PMF partially matching the recorded data and the synthetic data. The method further includes generating auxiliary data using the PMF and one of the synthetic and recorded data; and updating the model based on the auxiliary data. The updated model is useable to locate natural resources in the explored underground structure.

BRIEF DESCRIPTION OF THE DRAWINGS

For a more complete understanding of the present inventive concept, reference is now made to the following descriptions taken in conjunction with the accompanying drawings, in which.

DETAILED DESCRIPTION OF THE INVENTION

Figure 1:
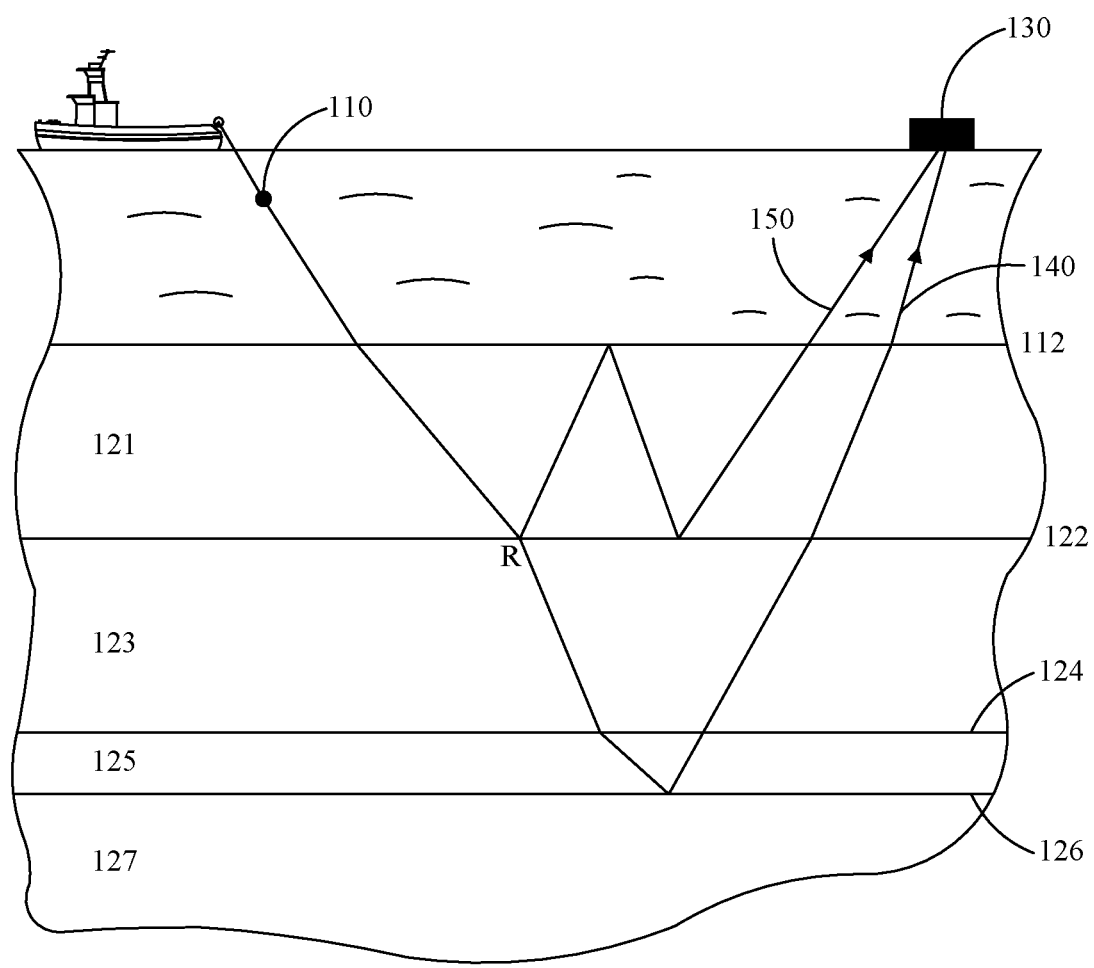
FIG. 1 illustrates the setup of a marine seismic survey.
Figure 2:
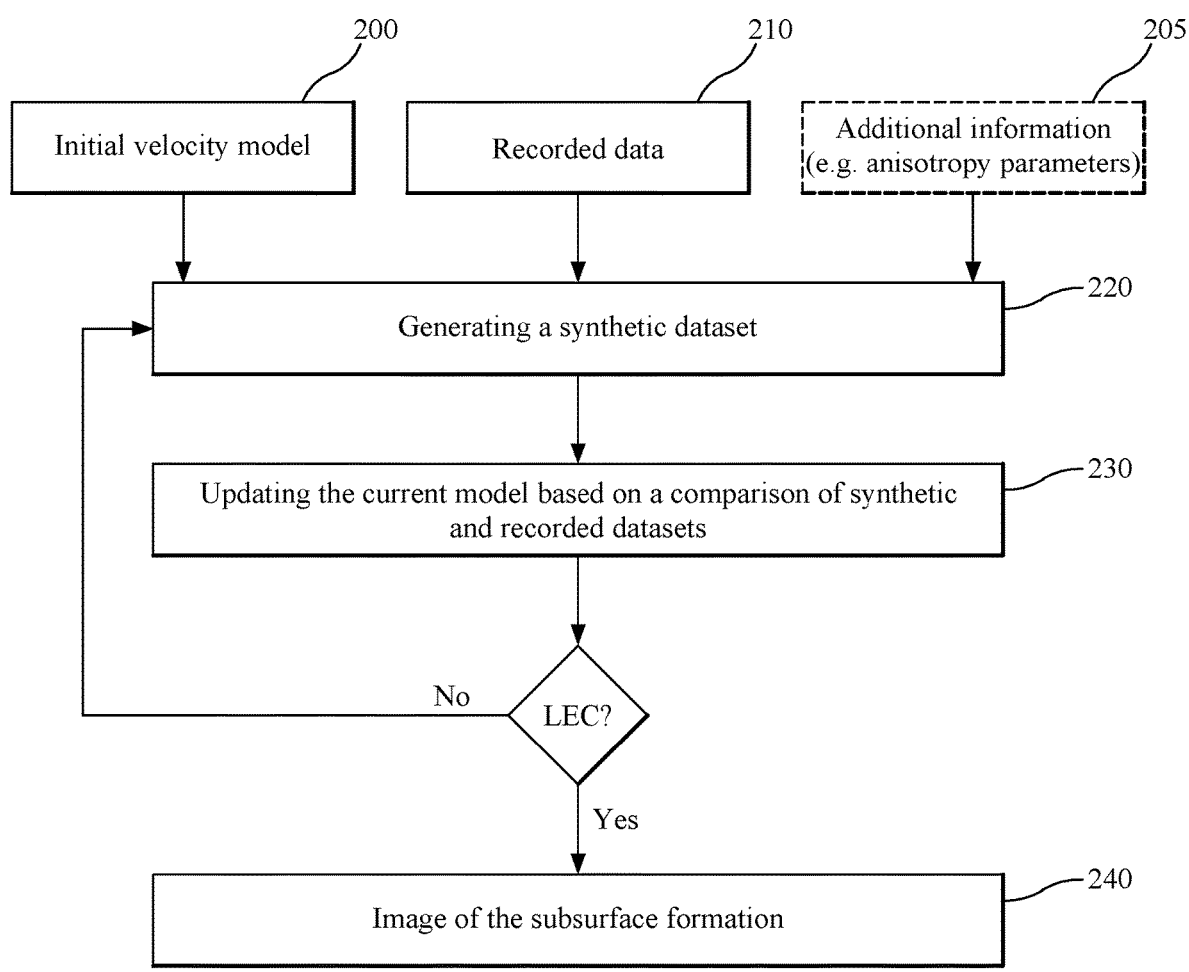
FIG. 2 is a diagram of the FWI technique.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed in the context of seismic exploration, but is pertinent also for other methods, such as medical imaging (as described for example, in the 2020 article, "Full-waveform inversion imaging of the human brain" by Guasch et al., published in Digital Medicine), civil engineering, mining, nuclear monitoring and electromagnetics.

Reference throughout the specification to "one embodiment" or "an embodiment" means that a particular feature, structure or characteristic described in connection with an embodiment is included in at least one embodiment of the subject matter disclosed. Thus, the phrases "in one embodiment" or "in an embodiment" in various places throughout the specification are not necessarily referring to the same embodiment. Further, the particular features, structures or characteristics may be combined in any suitable manner in one or more embodiments.

The embodiments described in this section describe various FWI methods in which auxiliary data, generated using a partial match filter (PMF) between the recorded data and the synthetic data, replaces one of the synthetic and recorded data in the objective function, minimized to improve the model of the subsurface.

A matching filter connecting two datasets may be designed to achieve an exact match; that is, application of such a filter to the first dataset will yield the second dataset exactly. Such filters are of limited use, as they simply reproduce the second dataset, which is already known.

In practice, additional constraints are normally imposed during the matching filter derivation process. These constraints may be imposed, for example, to improve stability, reduce computational cost, or to simplify the derivation. As an indirect consequence of these constraints, such a filter may not provide an exact match between the two datasets, and so can be regarded as partial in this sense.

However, hereafter it is drawn a distinction between constrained filters of this type (referred to as "full" or "conventional" matching filters), and PMFs, where constraints are imposed specifically with the intention of avoiding an exact match. The distinction between these two categories of filter is discussed below.

Consider a constrained filter matching a first dataset to a second dataset, together with the associated misfit (that is, the difference between the second dataset, and the result of applying the filter to the first dataset). If the filter is a conventional matching filter, and the constraints are designed in such a way that the misfit is negligible, the filtering operation is considered successful if any other conditions associated with the constraints (e.g. stability, computational cost etc.) are also satisfied.

If the filter is a PMF, however, if the misfit is negligible then the filtering operation is not considered successful. One intent behind the constraints used in designing a PMF is to avoid (in a controlled way) a negligible misfit with the second dataset. An example of a PMF used outside of the context of FWI is a matching filter used for adaptive subtraction of a multiple model dataset from an input seismic dataset containing both primaries and multiples. Here, the intent is to design a filter between the input dataset and the model dataset which matches the energy related to multiples (present in both datasets) but not the energy related to primaries (present only in the input dataset). Typically, the filter is constrained to avoid a full match of both primary and multiple events by restricting its length in the design process.

The same constraint mechanism (e.g. addition of white noise, restriction of filter length etc.) may be used in the design of either of the two categories of filter identified above, but to different degrees and with different intent, as discussed above.

Figure 3:
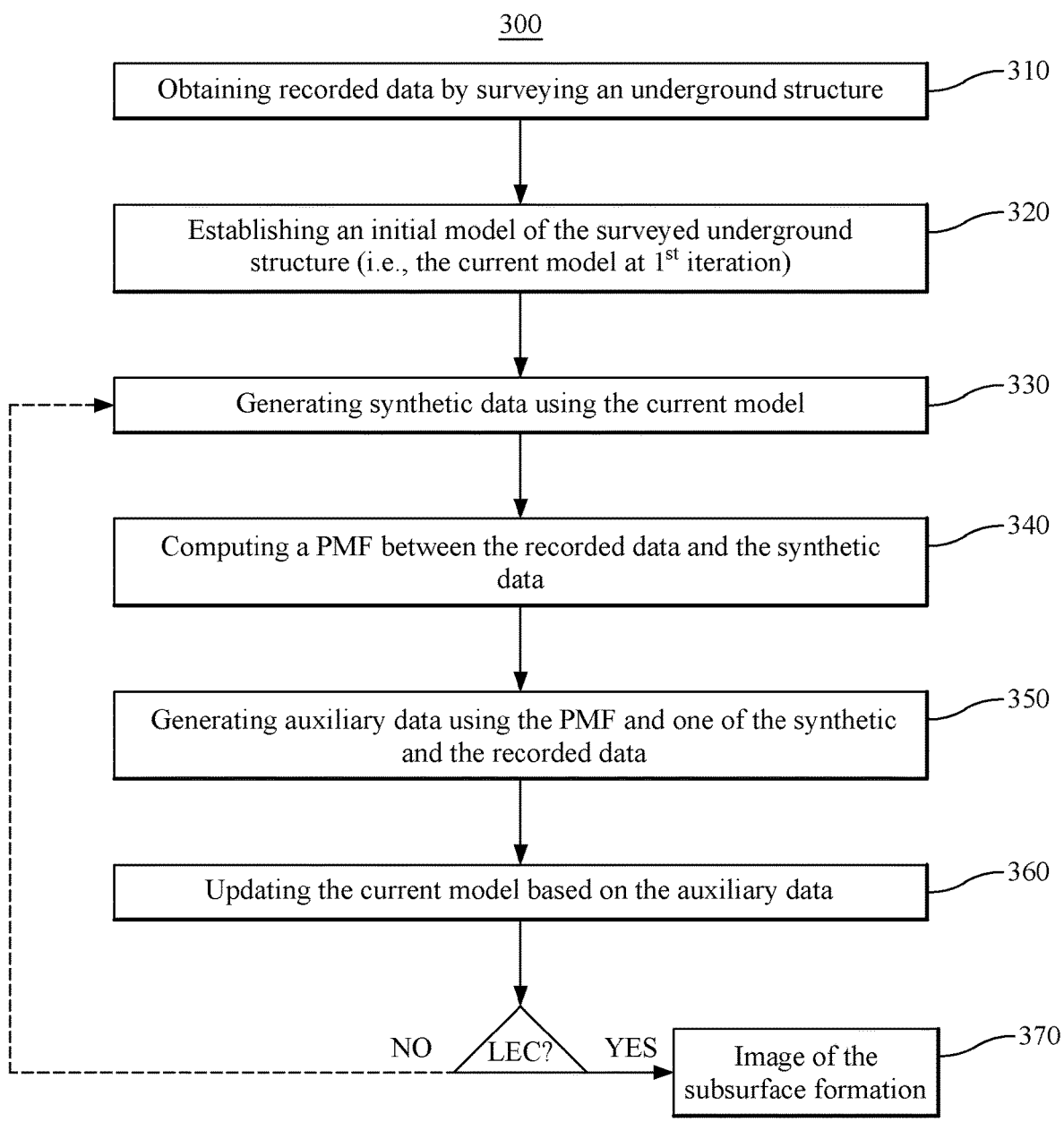
FIG. 3 is a flowchart of an FWI method using partial match filtering, PMF, according to an embodiment.

FIG. 3 is a flowchart of an FWI method using a PMF according to an embodiment. Method 300 starts with obtaining recorded data by surveying an underground structure of interest. This data recorded by sensors as previously discussed may also be called observed or real data and may be acquired during a recent survey or may have been acquired during a survey performed a while ago but studied anew. At 320, an initial model of the underground structure is established. The initial model may be the result of travel time tomography on the recorded data, may have been obtained by applying conventional FWI to the recorded data or may be based on well log information. The model may represent p-velocity, s-velocity, various types of anisotropy, attenuation, or any other properties.

The initial model is the current model for the first iteration of the FWI with PMF loop that is performed until a loop exit condition (LEC) is met. The loop includes steps 330, 340, 350 and 360. At 330, synthetic data is generated using the current model. To generate the synthetic data, it is mathematically simulated that waves emitted by the source having the source signature of the real source propagate through a formation having a structure according to the current model and are detected by the sensors that recorded the observed data. In conventional FWI, the current model was then updated based on comparing synthetic data with the observed data (e.g., using a gradient of an objective function representing the least square of differences). In order to avoid cycle skipping, mitigate amplitude inconsistencies and achieve other benefits later discussed, in FWI with PMF, a filter partially matching the observed data and the synthetic data is computed at 340, and used together with one of the observed data and the synthetic data to generate auxiliary data at 350. Various techniques of calculating the PMF are described in detail later. The PMF may be applied in a time-space domain or another domain, such as an intercept-slowness (τ–p) domain, a frequency-wavenumber (f–k) domain, an intercept-parabola (τ–q) domain, an intercept-hyperbola domain, a curvelet domain, a wavelet domain, a singular value decomposition domain, a rank reduction domain, a ridgelet domain or a contourlet domain, etc.

The current model is updated at 360 in the same manner as in conventional FWI (e.g., using the objective function's gradient) except that the objective function is a function of the auxiliary data, as well as one of the observed data or the synthetic data. The FWI objective function used at 360 to update the current model may represent least-squares differences between the sets of data, but alternatively may be another objective function such as a travel-time-based objective function, an optimal transport-based objective function, etc. The loop (i.e., steps 330-360) is performed using the updated current model until the LEC is met.

The LEC may be a convergence criterion (e.g., the objective function becomes smaller than a threshold or the difference between objective function values calculated at successive iterations is less than a predetermined threshold), having performed the loop a predetermined number of times, or any another suitable criterion. The output model (i.e., the current model as updated in the last iteration) is or may be used to generate an image of the underground formation at 370. The image is usable to detect the presence of natural resources in the subsurface, which include, but are not limited to, hydrocarbons, mineral deposits and geothermal pockets.

The loop 330-360 may include additional constraints or regularization techniques. These techniques are generally designed to honor a priori information, but may also be designed to impose various hypotheses or behaviors of the model, for example: (a) imposing a mask, or no update, zone in the model; (b) incorporating information from well-logs; (c) incorporating other a priori information, for example, from 4D differences or a tomographic model update; (d) imposing a bound, or box constraint, on the model parameters; (e) imposing an edge-preserving constraint; (f) imposing a total-variation constraint; (g) imposing a hinge-loss one-sided constraint; (h) imposing a cross-gradient constraint; (i) imposing facies-based constraints, etc., and all possible combinations of such techniques.

To detail now various embodiments of computing the PMF, consider N common shot gathers $S_n$ (where n= 1, . . . , N) of recorded traces, where each trace recorded by a receiver k representing time series of amplitude values indexed by i, and N common shot gathers $T_n$ of synthetic traces corresponding to the recorded traces gathers $S_n$. The synthetic traces are obtained by forward wave equation propagation of a pre-defined source wavelet through a current velocity model, V. The objective function, F(V), used for conventional FWI is then:

$$F(V)=\Sigma_n\Sigma_k\Sigma_i(S_n[k,i]-T_n[k,i])^2. \quad (3)$$

Both $S_n$ and $T_n$ may be preconditioned prior to calculating F(V) by normalizing their amplitudes in time and/or space, applying a filter, or similar process, to remove noise or enhance signal, applying a filter to highlight a given seismic frequency, or range of seismic frequencies, applying a mute function to highlight a given set of seismic events, etc. Here, it is assumed that any such preconditioning is taken into account implicitly in the definition of $S_n$ and $T_n$.

If the model V is sufficiently inaccurate, then cycle skipping between the modeled data $T_n$ and the observed data $S_n$ occurs. In order to avoid this undesirable situation, in one embodiment the objective function is modified by replacing the observed data $S_n$ with an auxiliary dataset $S_n^*$, obtained using filters partially matching $S_n$ to $T_n$, $$F^*(V)=\Sigma_n\Sigma_k\Sigma_i(S_n^*[k,i]-T_n[k,i])^2. \quad (4)$$

The PMF is designed to avoid cycle skipping between $T_n$ and $S_n^*$ but not to achieve a perfect match. In the case of a perfect match, the model can no longer be updated because the objective function comparing $T_n$ and $S_n^*$ would be zero. The partiality of the match is controlled such that cycle skipping between the auxiliary data (which is obtained from applying the PMF to the observed data) and the synthetic data is avoided, yet the match is not so close as to impede the model updating. The auxiliary dataset can optionally be recalculated in every FWI iteration. The terms "partial matching" and "partial match" are used interchangeably and mean the same.

In another embodiment, the objective function (4) is modified by replacing the synthetic data with the auxiliary data.

Filters connecting the two sets of data may exist in the time-space domain (t, x, y) or in a domain other than the time-space domain. Examples of other domains include, but are not limited to, the intercept-slowness or linear Radon (τ–p) domain, the parabolic Radon (τ–q) domain, the frequency-wavenumber (f–k) domain and the curvelet domain.

PMFs may be convolutional filters derived to partially convert one dataset to another. For example, a convolutional filter may be derived to match one set of data with another set of data subject to a filter length constraint (i.e., less than the entire data set length) in such a way that precludes the resulting filtered data, obtained by application of the filter to the first dataset, from being an exact match of the second dataset.

Mathematically, a one-dimensional (1D) matching filter f applied to data set a optimally approximates data set b, thus minimizing a quantity Δ where:

$$\Delta = \Sigma(a - b*f)^2. \quad (5)$$

More generally, filters may be multi-dimensional, for example, in time and one or more spatial dimensions or in other domains. The filters may be derived by least-squares inversion (for example, Wiener filtering), via sparse inversion, or by other known methods. Filters may be applied either as convolutions, or by multiplications in a frequency domain (temporal and/or spatial).

In the case of a conventional Wiener matching filter, for a given filter length, the optimal 1D filter in a least-squares sense is obtained by solving the equation $$\Phi_{a,b} = \Phi_{b,b} f \quad (6)$$

where $\Phi_{b,b}$ is a matrix related to the autocorrelation of b, and $\Phi_{a,b}$ is the cross-correlation vector of a with b.

A PMF may be obtained using various techniques described below in a 1D scenario, but that can be easily extended to plural dimensions. A first technique is to add white noise to the diagonal of the matrix $\Phi_{b,b}$ in equation (6). The white noise addition has a damping effect, which increases the minimal achievable value of the misfit between a and b*f in equation (5).

A second technique decreases the pre-defined length of the filter f in equation (5) before solving equation (6). Shorter filters have fewer degrees of freedom and, in general, decreasing the filter length tends to increase the minimal achievable misfit between a and b*f.

A third technique solves equation (6) iteratively, for example, using a conjugate gradient or steepest descent algorithm, the solver being terminated after a small number of iterations, preventing full convergence to the minimal misfit.

A fourth technique solves equation (6) using singular value decomposition and then forming a partial solution by considering only a small number of the largest eigenvalues (as opposed to all the eigenvalues that would yield a perfect match). Alternatively, in a fifth technique, a partial solution is formed by adding a small fraction of the largest eigenvalue to all the other eigenvalues prior to calculating the inversion of equation (6).

In a sixth approach, a large number of matching filters may be optimally derived, each filter corresponding to a single point of a in equation (5). For example, 100 observed data points means 100 filters. If each filter were three points in length, then there would be considerably more filter points than observed data points, so that it becomes necessary to add additional constraints. One reasonable constraint (given the underlying physical reality) is for the filters to vary smoothly in one or more directions. For example, the derivative of a single filter in the time direction may be constrained as follows:

$$\begin{pmatrix} a_2 \\ a_3 \\ a_4 \\ 0 \\ 0 \end{pmatrix} \sim \begin{pmatrix} b_3 & b_2 & b_1 \\ b_4 & b_3 & b_2 \\ b_5 & b_4 & b_3 \\ \alpha & -\alpha & 0 \\ 0 & \alpha & -\alpha \end{pmatrix} \begin{pmatrix} f_1 \\ f_2 \\ f_3 \end{pmatrix}. \quad (7)$$

This example relates to a filter corresponding to the data point $a_4$ in a. The symbol "~" indicates that this problem is solved in a least-squares sense, resulting in an equation analogous to equation (5). The first three rows of the matrix relate to convolution of data points in b with the filter f. The last two rows constrain the rate of change of the filter points from one sample to the next. In a least-squares sense, this formulation seeks to minimize the difference between one filtered point and the next, subject to the constraints described by the first three rows. The magnitude of a allows control of the weight of the constraints described by the last two rows (related to the rate of change of the filter points relative to the constraints described by the first three rows).

A seventh technique constrains the rate of change between filters. For example, equation (8) shows three filters (f, g, h) corresponding to data points $k_4$, $l_4$ and $m_4$, the filters being derived simultaneously and applied to time series (p, q, r) to produce output time series (k, l, m).

$$\begin{pmatrix} k_2 \\ k_3 \\ k_4 \\ l_2 \\ l_3 \\ l_4 \\ m_2 \\ m_3 \\ m_4 \\ 0 \\ 0 \\ 0 \\ 0 \\ 0 \\ 0 \end{pmatrix} \sim \begin{pmatrix} p_3 & p_2 & p_1 & 0 & 0 & 0 & 0 & 0 & 0 \\ p_4 & p_3 & p_2 & 0 & 0 & 0 & 0 & 0 & 0 \\ p_5 & p_4 & p_3 & 0 & 0 & 0 & 0 & 0 & 0 \\ 0 & 0 & 0 & q_3 & q_2 & q_1 & 0 & 0 & 0 \\ 0 & 0 & 0 & q_4 & q_3 & q_2 & 0 & 0 & 0 \\ 0 & 0 & 0 & q_5 & q_4 & q_3 & 0 & 0 & 0 \\ 0 & 0 & 0 & 0 & 0 & 0 & r_3 & r_2 & r_1 \\ 0 & 0 & 0 & 0 & 0 & 0 & r_4 & r_3 & r_2 \\ 0 & 0 & 0 & 0 & 0 & 0 & r_5 & r_4 & r_3 \\ \alpha & 0 & 0 & -\alpha & 0 & 0 & 0 & 0 & 0 \\ 0 & \alpha & 0 & 0 & -\alpha & 0 & 0 & 0 & 0 \\ 0 & 0 & \alpha & 0 & 0 & -\alpha & 0 & 0 & 0 \\ 0 & 0 & 0 & \alpha & 0 & 0 & -\alpha & 0 & 0 \\ 0 & 0 & 0 & 0 & \alpha & 0 & 0 & -\alpha & 0 \\ 0 & 0 & 0 & 0 & 0 & \alpha & 0 & 0 & -\alpha \end{pmatrix} \begin{pmatrix} f_1 \\ f_2 \\ f_3 \\ g_1 \\ g_2 \\ g_3 \\ h_1 \\ h_2 \\ h_3 \end{pmatrix} \quad (8)$$

Each of these techniques may yield filters which are, in some sense, partial. The outcome of applying a PMF is considered successful if the resulting auxiliary data is (i) within half a cycle of the second dataset to be used in the objective function, for the bandwidth of data used for the present iteration (thereby avoiding cycle skipping) and (ii) intermediate between the observed and the synthetic data, in the sense that the FWI gradient obtained from the objective function in equation (4) perturbs the candidate model in such a way that it becomes more similar to the true model. An optional third criterion for the resulting auxiliary data is that it is consistent in amplitude with the second dataset to be used in the objective function. Based on these criteria, it is therefore desirable to have a mechanism to quantify and control the degree to which a filter is considered partial; namely, how closely the filter matches the observed and the synthetic data.

In order to describe an eighth technique, consider $A_n$ and $B_n$ respectively the representations of the datasets $S_n$ and $T_n$ in a domain other than the space-time domain. For a set of M matching filters $W_m$ (m=1, . . . , M) which, taken together, match $A_n$ and $B_n$ (obtained, for example, by conventional Wiener filter design) a specific filter $W_m$ operates with respect to a particular time window and/or space window of traces in $A_n$ and $B_n$. For a discrete sample interval u, the filter $W_m[u]$ describes a discretization of a continuous filter $C_m(r)$, for some $r \in \mathbb{R}$. A second filter $Q_m[u]$ corresponding to $W_m[u]$ may then be obtained by sampling the continuous filter $C_m((1+\epsilon), \epsilon \in \mathbb{R}$, at the same sample locations as in the original filter. The factor $\epsilon$ is referred to as the squeeze factor. It is an adjustable parameter controlling the degree to which the original filter is squeezed (if $\epsilon>0$) or stretched (if $\epsilon<0$). More generally, two-sided filters may have an anticipation component (r>0) and a memory component (r<0). The squeezing operation as defined above thus operates about r=0. The squeeze factor, $\epsilon$, may be a constant or a variable depending, for example, on one or more of the models, the recorded data, the synthetic data or the filter. Alternatively, the squeeze factor may be a function of one or more of the distribution of energy in the filter and the time of the envelope peak of the matching filter. The squeeze factor may additionally vary as a function of frequency; that is, related to bandpass filtering the synthetic and recorded data, to a plurality of bandwidths, calculating a matching filter for each bandwidth, and using a different squeeze factor for the different matching filters. Alternatively, the matching filter may be bandpass filtered, and different squeeze factors may be used for each matching filter.

In one embodiment, the application of the set of squeezed filters $Q_m$ (m=1, . . . , M) to $A_n$ results in an auxiliary dataset $A_n^*$ which is intermediate between $A_n$ and $B_n$, $A_n^*$ corresponding to an auxiliary dataset $S_n^*$ in the observed data domain, and thus $S_n^*$ is intermediate between $S_n$ and $T_n$.

In another embodiment, the application of the set of squeezed filters $Q_m$ (m=1, . . . , M) to $B_n$ results in an auxiliary dataset $B_n^*$ which is intermediate between $A_n$ and $B_n$, $B_n^*$ corresponding to an auxiliary dataset $T_n^*$ in the observed data domain, and thus $T_n^*$ is intermediate between $S_n$ and $T_n$.

The squeeze factor $\epsilon$ controls the degree to which the filter is considered partial. A squeeze factor of $\epsilon=0$ relates to a full matching filter (as obtained by, for example, conventional Wiener filter design), with the filter becoming progressively more partial as the magnitude of $\epsilon$ is increased. In one embodiment, where the objective function is a function of the synthetic and auxiliary data, the auxiliary data may be more similar to the synthetic data than the recorded data is to the synthetic data. In one example, the similarity measure may relate to the timing of events in the datasets.

In a non-limiting example, the continuous filter $C_m(r)$ need not be explicitly constructed. Any $1+\epsilon$ may be expressed to arbitrary precision as a terminating decimal, p, and this determines a discrete sample interval v for which both u and pu are integer multiples of v. Then each $W_m$ is resampled from a sample interval of u to a sample interval of v, then each $Q_m$ is formed by selecting samples at intervals pu from the resampled filter. The approach of squeezing the filters may involve an interpolation of samples in-between the original sample positions, performed, for example, using sinc interpolation. The filter thus derived remains a convolutional filter, for example:

$$S_n^* = L^{-1}(Q^*A_n) \quad (9)$$

wherein $Q^*A_n$ represents the convolution of the squeezed filters $Q_m$ (m=1, . . . , M) with $A_n$ over appropriate windows, and $L^{-1}$ representing a reverse transform operator from the domain in which the filters are designed and applied to the observed data domain in which the objective function is calculated. An expression for $T_n^*$, similar to (9), can be derived in an analogous way for the case where the squeezed filters are instead convolved with the dataset $B_n$.

As previously discussed, the PMF may relate to a matching 1) from the observed data to the synthetic data, or 2) from the synthetic data to the observed data. In case 1), the auxiliary data may be obtained by applying a squeeze factor to the matching operation. In case 2) a different squeeze factor may be required to achieve a similar outcome. As an illustrative example, in case 1) a small squeeze factor may result in an acceptable outcome, whereas a larger squeeze factor may be required in case 2).

Any of the above-described techniques may be applied to compute a PMF in step 340 of FIG. 3.

In one embodiment, the auxiliary data may be generated by solving an additional inversion problem so that when the PMF is applied to the auxiliary data it approximates one of the synthetic or recorded datasets, for example in a least squares sense. As an example where the recorded dataset vector, r, is used, and the matrix P is a linear operator which convolves the auxiliary data vector, a, by the PMF:

$$r \approx Pa.$$

Recorded seismic data may contain energy from a number of different types of wave, including diving waves, reflections (for example, PP, PS, SP and SS waves), diffractions, refractions, guided waves, evanescent waves and direct waves.

Partial matching filters can be used to mitigate cycle skipping and amplitude related issues in formulations of FWI using diving waves. The use of partial matching filters can also optionally be used in other forms of FWI that suffer from cycle skipping or amplitude related issues, relating to the types of waves discussed above. One example is the method described in the 2009 article entitled "Traveltime information-based wave-equation inversion" proposed by Zhang et al. (published in *Geophysics*, vol. 74, no. 6, WCC27-WCC36), in which the inversion seeks to minimize the energy of the back-propagated receiver wavefield (at time zero) in a region of space surrounding the source location. The objective function used in the inversion thus measures how well the current Earth model describes the collapse of the back-propagated receiver wavefield to the location of the source at time zero. In this approach, an analogous effect to cycle skipping can occur when the initial Earth model is sufficiently inaccurate that the back-propagated receiver wavefield does not collapse sufficiently closely to the source location to be measured by the objective function. In one embodiment, this effect can be mitigated by an additional step at the start of each iteration in this FWI scheme, in which a source wavelet is forward propagated through the current Earth model to generate synthetic data at the receiver locations, before the partial matching operation described herein is applied to the recorded receiver data, so that it partially matches the synthetic data. This partially matched data then replaces the observed data in the current iteration of this FWI scheme.

Partial matching filters can also be used to address cycle skipping and amplitude-related issues in Reflection FWI (RFWI). RFWI refers to any formulation of FWI using information from recorded reflection energy in the model update. This may pertain either to a direct use of the reflection energy within a conventional FWI scheme, or use of the reflection energy inside a scheme specifically designed to extract and exploit low wavenumber back-scattered information ('rabbit ears') from the reflections (as described in the 2012 article entitled "Full Waveform Inversion for Reflected Seismic Data", $4^{th}$ by Xu, S. et al. published at the EAGE Conference & Exhibition incorporating SPE EUROPEC, W024, and in U.S. Pat. No. 10,310,123). In RFWI, the cycle skipping of reflected events can occur if a sufficiently inaccurate starting model is used, in a way which is analogous to cycle skipping in diving wave FWI. Moreover, amplitude discrepancies between observed and modelled reflections can arise due to elastic effects (for example, amplitude-versus-offset or amplitude-versus-angle effects), visco-acoustic or visco-elastic effects (so-called attenuation or 'Q effects'), or other effects. In one embodiment, the partial matching operation described herein can be applied to the recorded reflection data to make it partially match the synthetic reflection data generated from a forward modeling scheme. The partially matched data then replaces the observed data in the current iteration of this FWI scheme. The use of auxiliary data mitigates cycle skipping between the recorded and modeled reflections, as well as adjusting the amplitude behavior of the recorded reflections to more closely follow that of the synthetic data generated from the forward modeling.

The use of partial matching filters can also be incorporated into the FWI scheme for building a shear-wave velocity (Vs) model using mode-converted pressure-to-shear wave (PS) reflection data (PS-RFWI), as described in U.S. patent application Ser. No. 16/870,274, which itself is related to U.S. Pat. No. 10,310,123. Specifically, this PS-RFWI method is based on generating a back-scattered term in the FWI gradient that corresponds to the travel-path traversed by the mode-converted shear-wave from a pressure-to-pressure (PP) reflector and into the recording device. In one embodiment, the partial matching operation described herein can be applied to the recorded PS receiver data to make it partially match the synthetic data generated by Born modeling, then this partially matched data replaces the observed data in the current iteration of this FWI scheme. The use of partial matching filters reduces cycle skipping between the recorded PS receiver data and the synthetic data generated by Born modeling (as described in the 2001 article "General theory of elastic wave scattering, in Scattering and Inverse Scattering in Pure and Applied Science:" by R. Sneider Academic Press Inc., pp. 528-541), as well as adjusts the amplitude behavior of the recorded PS receiver data to more closely follow that of the synthetic data generated by Born modeling.

The use of partial matching filters in FWI is not limited to the conventional, least-squares-based, objective function described in equation (3), and PMF's can be used in a travel-time objective function (as described in the 2018 article, "Correcting for salt misinterpretation with full-waveform inversion" by Zhang et al., published in the 88th SEG Annual International Meeting, Expanded Abstracts), an optimal transport objective function (as described in the 2018 article, "FWI with optimal transport: a 3D implementation and an application on a field dataset" by Poncet et al., published in the $80^{th}$ EAGE Conference and Exhibition, Extended Abstracts), adaptive waveform inversion (as described in the 2014 article, "Adaptive Waveform Inversion—FWI Without Cycle Skipping—Theory," by Warner et al., published in the $76^{th}$ EAGE Conference and Exhibition, Extended Abstracts), a time-lapse, or 4D, FWI (as described in the 2016 article, "Time-lapse full-waveform inversion as a reservoir-monitoring tool—A North Sea case study" by Hicks et al., published in The Leading Edge), or some other objective function.

In the case of adaptive waveform inversion, the objective function corresponds to an analysis of a convolutional filter between the observed and predicted (synthetic) data set. The approach aims to maximize the similarity or minimize the mismatch between the convolved observed data set and the predicted data set by driving the convolutional filter to match a reference filter. One shortcoming of this approach is that in the case that the observed and predicted data are significantly different, the convolutional filter to match them may be complex. As a result, driving this adaptive waveform convolutional filter to match with a reference filter may be challenging. This formulation is modified to use the auxiliary data set as a replacement for the observed data when computing the adaptive waveform inversion convolutional filter, so as to maximize the similarity or minimize the mismatch between the convolved auxiliary data set and the predicted data set. By doing so, this may simplify the complexity of the adaptive waveform inversion convolutional filter and improve the convergence of the process. In one embodiment, the auxiliary data (here labelled PMF-predicted data) is generated by using the partial matching filter (PMF) with the predicted (synthetic) data. In this case, the adaptive waveform inversion convolutional filter (which will match predicted data with PMF-predicted data) does not need to compensate for inherent differences such as noise content, etc. between the predicted (synthetic) and recorded data.

One feature of adaptive waveform inversion is that the reference filters are pre-determined. An alternative approach may be to derive the reference filters as a function of one of the predicted and the observed data. The use of a reference filter which is not pre-determined allows adjustment of the reference filter based on the quality of the data and any improved estimate of the source wavelet that is used in the forward modelling. This may lead to improved results with reduced noise contamination.

The computational efficiency of the method in FIG. 3 may be improved by changing the step length used to update the current model using the objective function's gradient. That is, a version i+1 of the current model $V_i$ is obtained as follows:

$$V_{i+1}(x,y,z)=V_i(x,y,z)+\beta_j{}^*g(x,y,z) \quad (10)$$

where g is the gradient and $\beta_j$ is known as the step length. The step length is needed because the gradient calculation gives no information as to the overall magnitude of the model update that would give the largest reduction in the objective function. Both the gradient and step length are calculated to update the model at each FWI iteration. The relative computational cost of calculating the gradient is usually considerably larger than the one for calculating the step length. Hence, it can be beneficial to compute the best possible step length for every FWI iteration. As discussed in the background, an extrapolation-based approach for estimating the step length, as well as performing a line search along the gradient direction, have been tried. However, in the context of using a partial matching approach, these strategies are not necessarily as efficient as in the conventional case because they converge the synthetic data to the auxiliary data, rather converging the synthetic data to the observed data.

Figure 4:
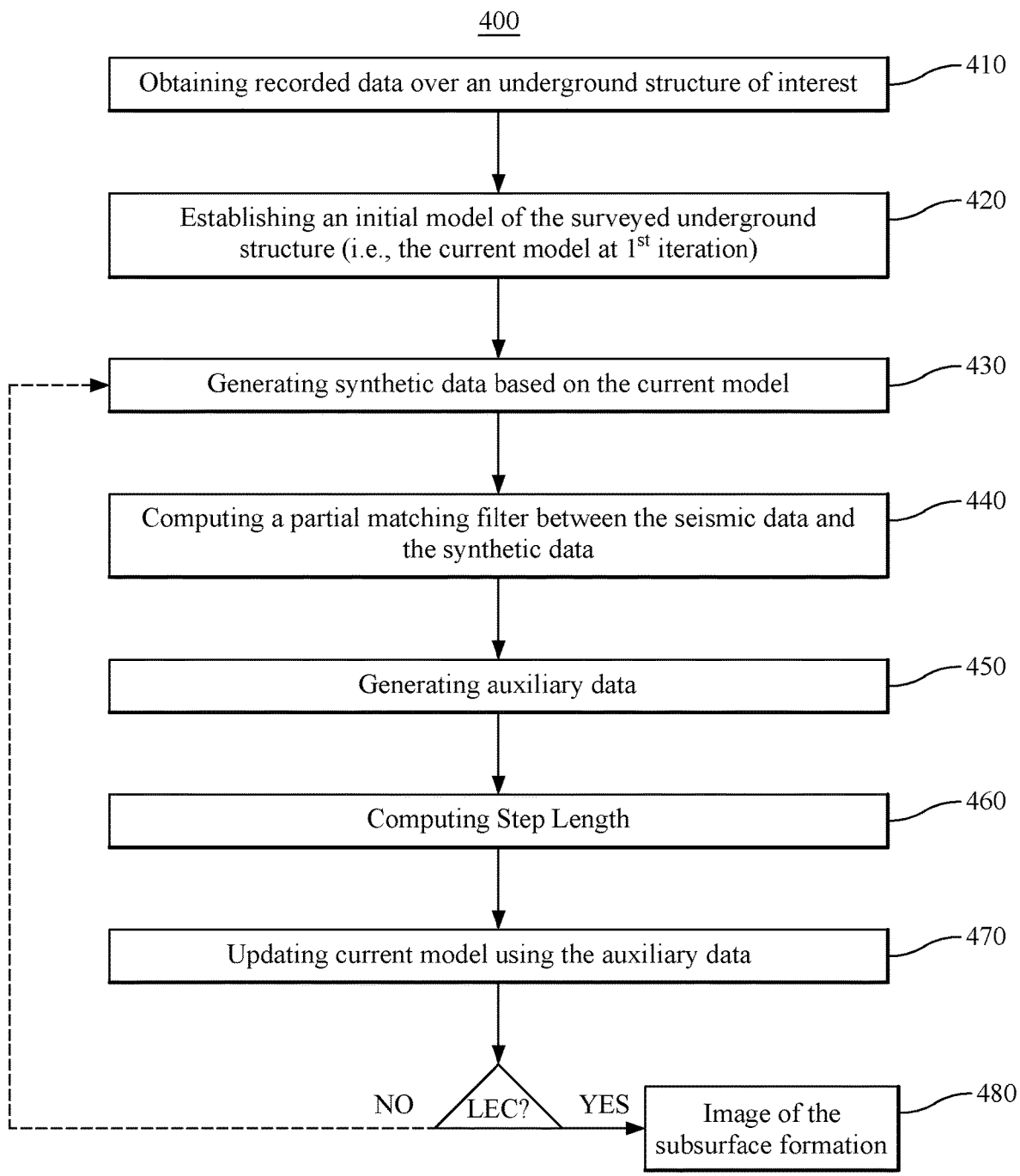
FIG. 4 a flowchart of an FWI method using PMF according to another embodiment.

FIG. 4 is flowchart of an FWI method using PMF with a line search for the step length, which re-computes the partially matched auxiliary data at every stage in the line search. By keeping the parameters in the partial matching operation fixed, the data difference objective function continues to have relative meaning and can be used to accelerate the convergence when the initial velocity model is far from the true model.

Figure 5:
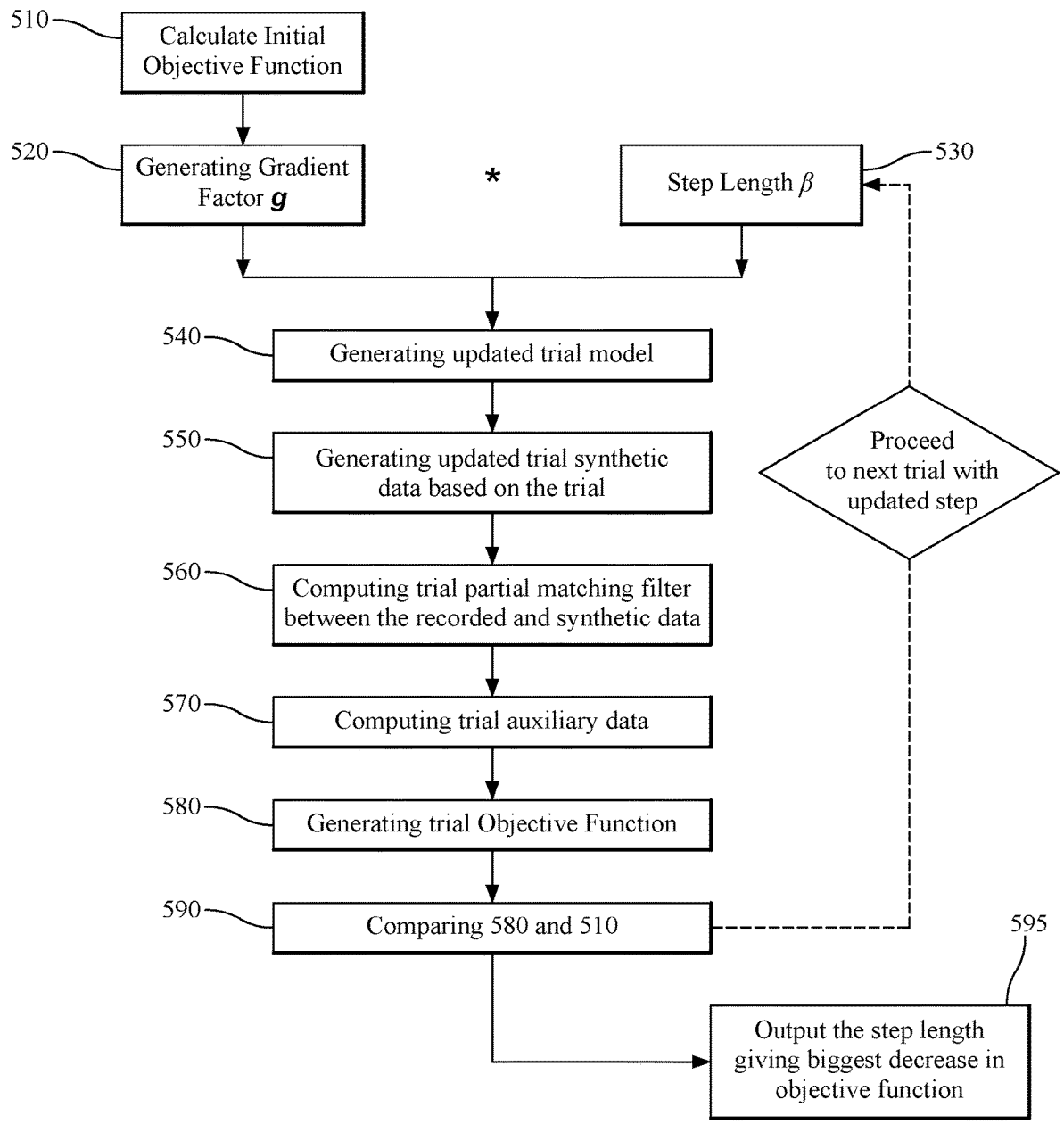
FIG. 5 is a flowchart of selecting step length according to an embodiment.

Referring to FIG. 4, steps 410-450 are similar to steps 310-350 in FIG. 3, so their description is omitted. The step length is computed in step 460, and then the current model is updated at 470. FIG. 5 details an exemplary embodiment of step 460.

Using an initial objective function L calculated at 510 based on the auxiliary data and one of the observed data or synthetic data (i.e., at step 450), a gradient factor g is generated at 520. This gradient factor then remains fixed until step length $\beta$ is selected (i.e., loop 530-580). The loop may be performed a predetermined number of times m, a dynamically determined number of times or until a significant decrease of the objective function is no longer observed. A trial step length is generated at 530. This may be obtained in a number of ways, described, for example, in Schuster, G. T., 2017, "Seismic Inversion", published by Society of Exploration Geophysicists. One example is to perturb the model by a small amount in a direction opposite to that of the gradient, determine the misfit for the perturbed model, then determine a trial step length by assuming a correspondence between changes in the misfit and the perturbation of the model. The trial step length is used at 540 to generate an updated trial model using equation (10). As the model is modified along the gradient direction, this step length search is known as a formal line search along the gradient direction. This updated trial model is based on a perturbation of the current model. The updated trial model is then used to generate a trial synthetic data at 550. At 560, a trial PMF between the seismic data and the trial synthetic data is generated. This PMF may be generated using any of the previously described techniques. At 570, applying the trial PMF to observed or to trial synthetic data yields trial auxiliary data. A trial objective function corresponding to the iteration is then computed at 580. This trial objective function is stored in association with the step length to be compared at 590 with the initial objective function, in order to select the step length causing the biggest decrease in the value of the objective function. The trial step lengths used in this loop can be chosen by a scan of a priori determined step lengths, or by the conventional methods described above that assume a correspondence between changes in the misfit and the perturbation of the model, or by some other method. The selected step length is outputted at 595 and is then used in step 470 to update the current model.

Figure 6:
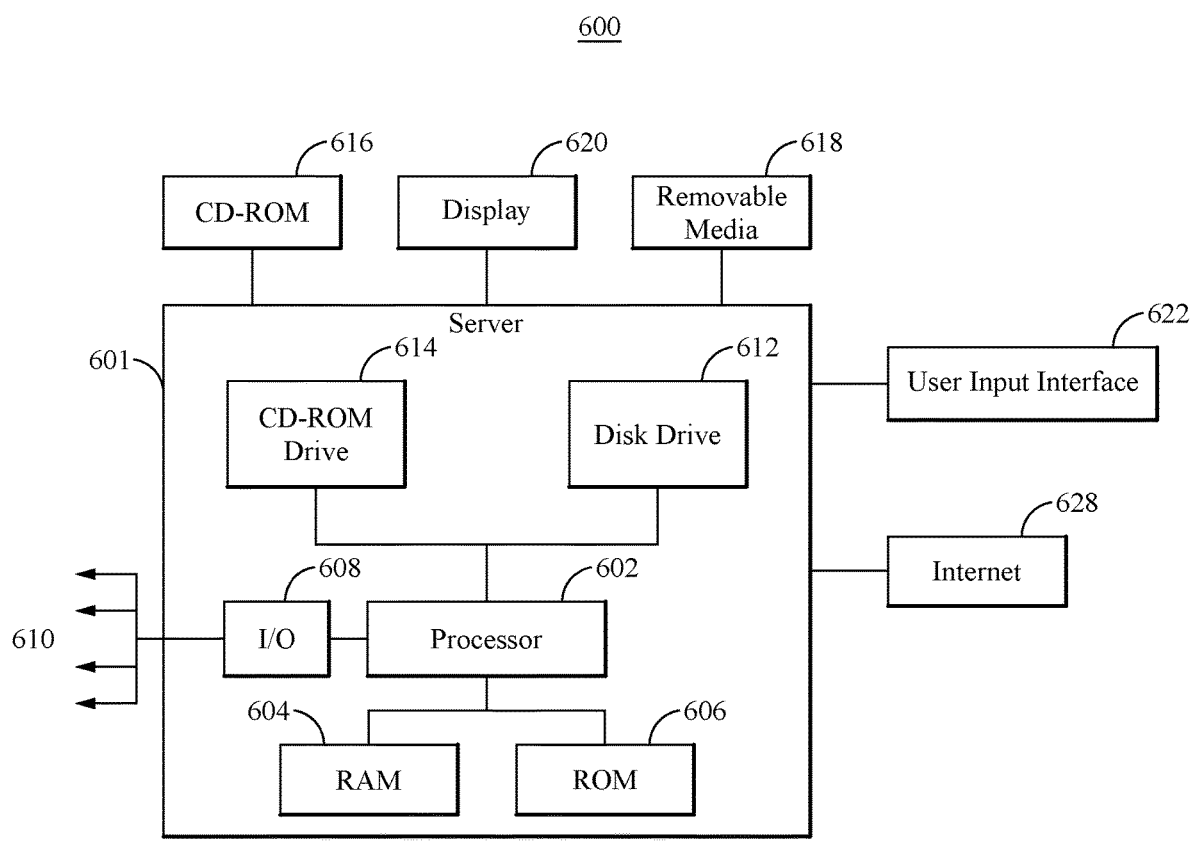
FIG. 6 is a schematic diagram of a seismic data processing apparatus according to an embodiment.

The above-discussed methods may be implemented in a data processing apparatus as illustrated in FIG. 6. Hardware, firmware, software or a combination thereof may be used to perform the various steps and operations described herein. Exemplary computing device 600 suitable for performing the activities described in the exemplary embodiments may include a server 601. Such a server 601 may include a central processor (CPU) 602 coupled to a random-access memory (RAM) 604 and to a read-only memory (ROM) 606. ROM 606 may also be other types of storage media to store programs, such as programmable ROM (PROM), erasable PROM (EPROM), etc. Processor 602 may communicate with other internal and external components through input/output (I/O) circuitry 608 and bussing 610 to provide control signals and the like. Processor 602 carries out a variety of functions as are known in the art, as dictated by software and/or firmware instructions.

Server 601 may also include one or more data storage devices, including hard drives 612, CD-ROM drives 614 and other hardware capable of reading and/or storing information, such as DVD, etc. In one embodiment, software for carrying out the above-discussed steps may be stored and distributed on a CD-ROM or DVD 616, a USB storage device 618 or other form of media capable of portably storing information. These storage media may be inserted into, and read by, devices such as CD-ROM drive 614, disk drive 612, etc. Server 601 may be coupled to a display 620, which may be any type of known display or presentation screen, such as LCD, plasma display, cathode ray tube (CRT), etc. A user input interface 622 is provided, including one or more user interface mechanisms such as a mouse, keyboard, microphone, touchpad, touch screen, voice-recognition system, etc.

Server 601 may be coupled to other devices, such as sources, detectors, etc. The server may be part of a larger network configuration as in a global area network (GAN) such as the Internet 628, which allows ultimate connection to various landline and/or mobile computing devices.

Computing device or computing apparatus 600 can be configured to implement any of the above-discussed procedures and methods, including combinations thereof.

The disclosed exemplary embodiments provide a computing device, software instructions and a method for seismic data processing. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration of an underground structure, the method comprising:
   obtaining recorded data which was acquired by probing the underground structure using seismic waves;
   generating synthetic data corresponding to the recorded data, using a model of the underground structure;
   computing a partial match filter, PMF, partially matching the recorded data and the synthetic data;
   generating auxiliary data using the PMF and one of the synthetic and recorded data; and updating the model based on the auxiliary data,
wherein the updated model is useable to locate natural resources in the explored underground structure.

2. The method of claim 1, where the auxiliary data is intermediate to the recorded and synthetic data.

3. The method of claim 2, where the auxiliary data is not cycle skipped relative to the synthetic data.

4. The method of claim 1, wherein the generating of the auxiliary data includes a convolution by the PMF.

5. The method of claim 1, wherein the generating of the auxiliary data includes solving a least squares problem.

6. The method of claim 1, where the computing of the PMF is constrained so that the auxiliary data is intermediate to the synthetic and recorded data.

7. The method of claim 1, wherein the PMF is modified after being computed, prior to the generating of the auxiliary data.

8. The method of claim 7, wherein the PMF is modified using an interpolation.

9. The method of claim 1, wherein the auxiliary data is used in combination with one of the synthetic data and the recorded data to update the model.

10. The method of claim 1, wherein the generating of the auxiliary data and the updating of the model are performed iteratively.

11. The method of claim 1, wherein the auxiliary data is generated in a time-space domain, in which the recorded data was acquired.

12. The method of claim 1, wherein the auxiliary data is generated in a second domain other than a time-space domain.

13. The method of claim 1, where the timing of events on the auxiliary data are more similar to the timing of events on the synthetic data than they are to the timing of events on the seismic data.

14. The method of claim 1, wherein the generating of the auxiliary data partially compensates for timing and amplitude differences between the recorded data and the synthetic data.

15. An apparatus for seismic exploration on an underground structure, the apparatus comprising:
an interface configured to obtain recorded data which was acquired during a survey of the underground structure using seismic waves; and
a data processing unit connected to the interface and configured
to generate synthetic data corresponding to the recorded data, using a model of the underground structure;
to compute a partial match filter, PMF, partially matching the recorded data and the synthetic data;
to generate auxiliary data using the PMF and one of the synthetic and recorded data; and
to update the model based on the auxiliary data,
wherein the updated model is useable to locate natural resources in the explored underground structure.

16. The apparatus of claim 15, wherein the auxiliary data is intermediate to the recorded and synthetic data.

17. The apparatus of claim 15, wherein the data processing unit generates the synthetic data, computes the PMF, applies the PMF to generate the auxiliary data and updates the model iteratively.

18. The apparatus of claim 15, wherein the data processing unit updates the model using a product of a gradient of the objective function and a step length selected using a formal line search along a gradient direction including plural iterations.

19. The apparatus of claim 18, wherein recorded and synthetic data are at least one of diving waves, PS, PP, SS, SP, reflections, diffractions, refractions, and guided waves.

20. A computer readable recording medium non-transitorily storing executable codes that when executed by a computer make the computer perform a method for seismic exploration of an underground structure, the method comprising:
obtaining recorded data which was acquired by probing the underground structure using seismic waves;
generating synthetic data corresponding to the recorded data, using a model of the underground structure;
computing a partial match filter, PMF, partially matching the recorded data and the synthetic data;
generating auxiliary data using the PMF and one of the synthetic and recorded data; and
updating the model based on the auxiliary data,
wherein the updated model is useable to locate natural resources in the explored underground structure.

* * * * *